US009113184B2

(12) United States Patent
Ashley et al.

(10) Patent No.: US 9,113,184 B2
(45) Date of Patent: *Aug. 18, 2015

(54) DELIVERING AN AUDIO VIDEO ASSET

(71) Applicant: Cisco Technology Inc., San Jose, CA (US)

(72) Inventors: Alex Ashley, Redhill (GB); Laurent Bertrand, Twickenham (GB); James Nord, Fareham (GB); Trevor Smith, Twickenham (GB); Simon John Parnall, Kingswood Surrey (GB)

(73) Assignee: Cisco Technology Inc., San Jose, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 13/847,132

(22) Filed: Mar. 19, 2013

(65) Prior Publication Data

US 2013/0268988 A1     Oct. 10, 2013

Related U.S. Application Data

(63) Continuation of application No. 13/391,812, filed as application No. PCT/IB2010/052889 on Jun. 24, 2010, now Pat. No. 8,429,700.

(30) Foreign Application Priority Data

Sep. 8, 2009   (GB) .................................. 0915661.3

(51) Int. Cl.
*H04N 7/173*     (2011.01)
*H04J 3/14*     (2006.01)
(Continued)

(52) U.S. Cl.
CPC .............. *H04N 21/258* (2013.01); *H04L 45/12* (2013.01); *H04L 45/123* (2013.01); *H04L 45/124* (2013.01); *H04L 45/22* (2013.01); *H04L 45/3065* (2013.01)

(58) Field of Classification Search
CPC ............ H04N 21/238; H04N 21/2385; H04N 21/258; H04L 45/12; H04L 45/123; H04L 45/124
USPC .............. 725/1, 54, 93, 98, 118, 63; 370/237, 370/238
See application file for complete search history.

(56) References Cited

U.S. PATENT DOCUMENTS 6,144,641 A    11/2000   Kaplan et al.
6,208,622 B1    3/2001   Makrucki
(Continued)

FOREIGN PATENT DOCUMENTS

EP         1 563 669 B1    5/2008
GB        2 379 589 B     8/2004
(Continued)

OTHER PUBLICATIONS

Transmittal of International Search Report and Written Opinion of International Searching Authority for the captioned application.
(Continued)

*Primary Examiner* — Pinkal R Chokshi
(74) *Attorney, Agent, or Firm* — Hahn Loeser & Parks LLP

(57) ABSTRACT

Delivering an audio video asset in a way that makes best use of different delivery mechanisms available.

21 Claims, 16 Drawing Sheets

(51) Int. Cl.
*H04N 21/258* (2011.01)
*H04L 12/725* (2013.01)
*H04L 12/707* (2013.01)
*H04L 12/721* (2013.01)

(56) References Cited

U.S. PATENT DOCUMENTS

| | | | |
|---|---|---|---|
| 6,310,883 B1 | 10/2001 | Mann et al. | |
| 6,363,319 B1* | 3/2002 | Hsu | 701/533 |
| 6,829,220 B1 | 12/2004 | Thorup et al. | |
| 7,423,973 B2 | 9/2008 | Chen et al. | |
| 7,746,789 B2 | 6/2010 | Katoh et al. | |
| 7,810,122 B2 | 10/2010 | Nadarajah | |
| 7,926,079 B2 | 4/2011 | Lebar | |
| 8,040,808 B1* | 10/2011 | Kasturi et al. | 370/238 |
| 8,199,655 B2 | 6/2012 | Kakadia et al. | |
| 2003/0156543 A1 | 8/2003 | Sahinoglu et al. | |
| 2003/0214912 A1 | 11/2003 | Khangsar et al. | |
| 2006/0250964 A1* | 11/2006 | Vasseur et al. | 370/238 |
| 2007/0195700 A1 | 8/2007 | Katoh et al. | |
| 2008/0025222 A1 | 1/2008 | Nikolova et al. | |
| 2009/0100459 A1 | 4/2009 | Riedl et al. | |
| 2011/0228678 A1* | 9/2011 | Ricciulli | 370/238 |

FOREIGN PATENT DOCUMENTS

| | | |
|---|---|---|
| GB | 2 418 267 A | 3/2006 |
| WO | WO 96/31969 | 10/1996 |
| WO | WO 01/17294 A1 | 3/2001 |
| WO | WO 03/071750 A1 | 8/2003 |
| WO | WO 2006/072825 A1 | 7/2006 |
| WO | WO 2009/076121 A1 | 6/2009 |
| WO | WO 2009/087550 A2 | 7/2009 |

OTHER PUBLICATIONS

Dec. 22, 2009 Office Communication in connection with prosecution of GB 0915661.3.

Oct. 4, 2011 Office Communication in connection with prosecution of GB 0915661.3.

Lydia Leong, "CDN overlays and more on MediaMelon" (Oct. 21, 2008).

Mar. 24, 2014 Office Communication in connection with CN 2010 8004 5687.0 (with English translation).

* cited by examiner

Order #1
Assets
  Popular Soap Opera
Destination
  Households with children
Criteria
  Priority

Order #2
Assets
  Niche Documentary
Destination
  Households no children
Criteria
  None – best effort

FIGURE 3

| Delivery Option | Destination | Capability | Scheme |
|---|---|---|---|
| "Euro Data Centre" → | "Households with children" | Broadband | "Internet" |
| "SatCasting Inc" → | "Households with children" | Satellite | "Satellite Broadcast" |
| "CDN Services Inc" → | "Households with children" | Broadband | "Internet" |

FIGURE 5

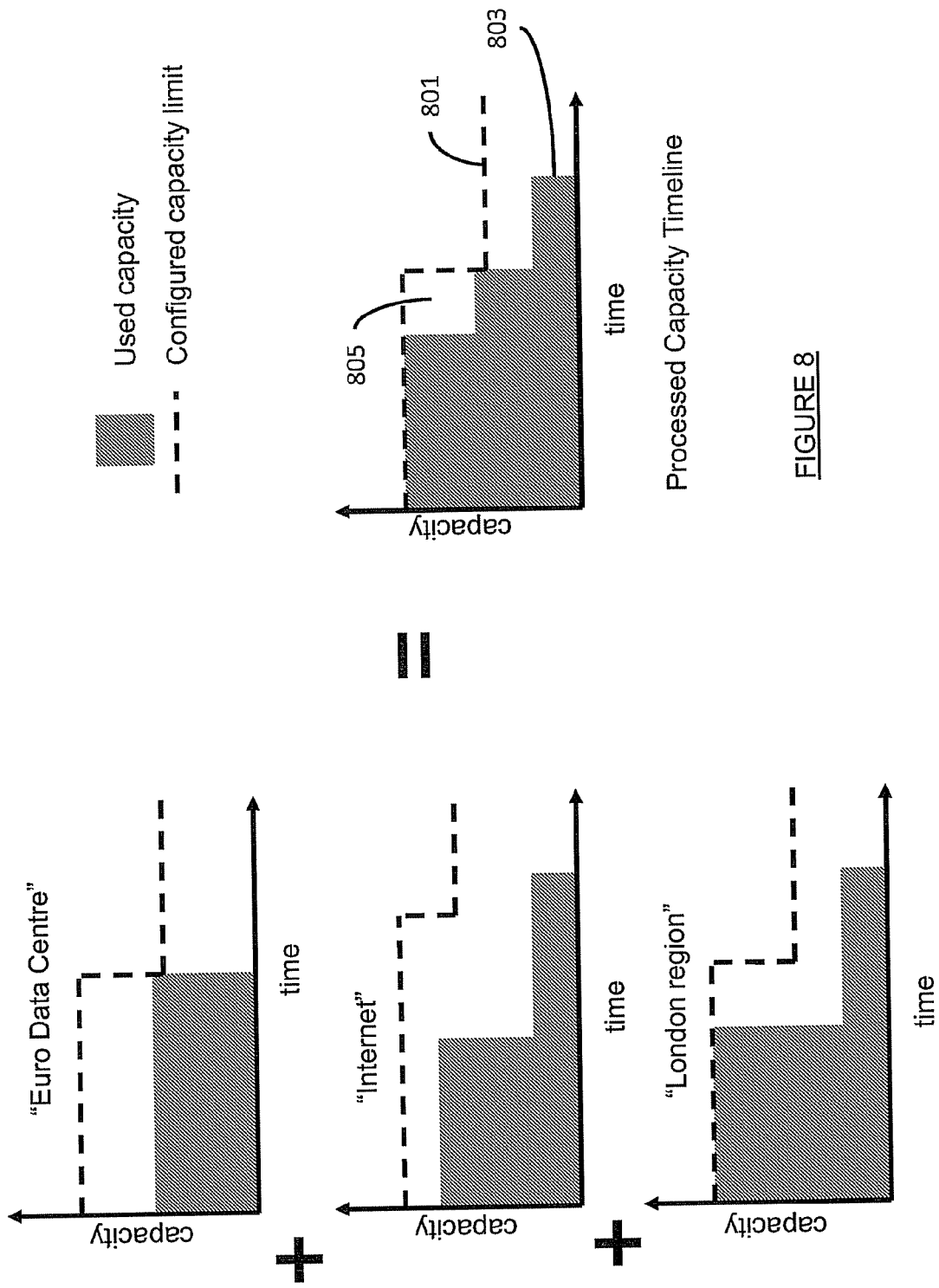

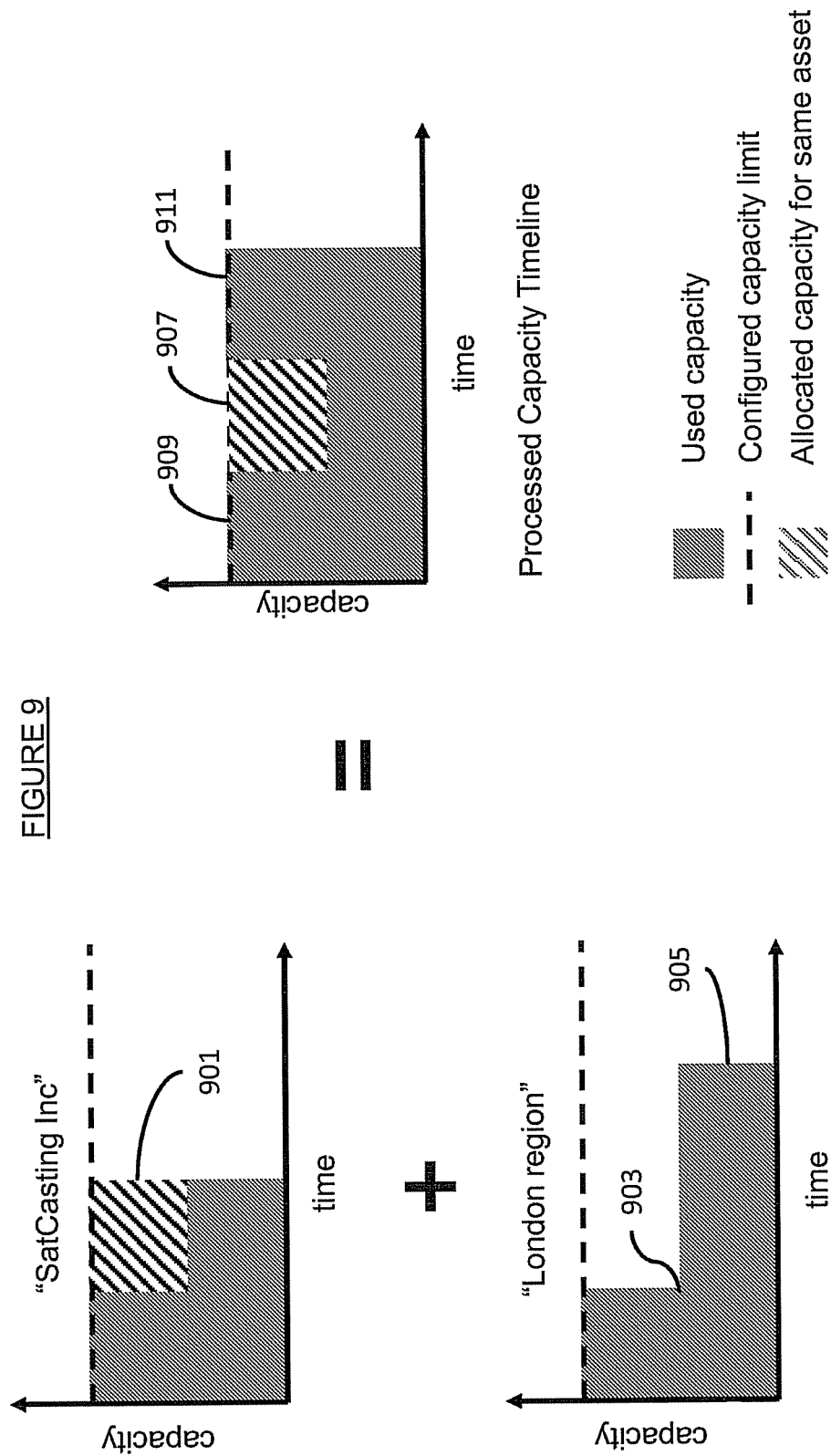

Using DVB-S Transponder assigned to "SatCasting Inc"

| Objective | Normalized Value | Weight | Score |
|---|---|---|---|
| Cost | 4 | 0.6 | 2.4 |
| Time to completion | 43 | 0.1 | 4.3 |
| Time to deliver | 10 | 0.3 | 3 |
| Overall score | | | 9.7 |

← Selected candidate

Using Download Server assigned to "Euro Data Centre"

| Objective | Normalized Value | Weight | Score |
|---|---|---|---|
| Cost | 43 | 0.6 | 25.8 |
| Time to completion | 10 | 0.1 | 1 |
| Time to deliver | 65 | 0.3 | 19.5 |
| Overall score | | | 46.3 |

Using Streaming Server assigned to "CDN Services Inc"

| Objective | Normalized Value | Weight | Score |
|---|---|---|---|
| Cost | 98 | 0.6 | 58.8 |
| Time to completion | 53 | 0.1 | 5.3 |
| Time to deliver | 30 | 0.3 | 9 |
| Overall score | | | 73.1 |

FIGURE 19

DELIVERING AN AUDIO VIDEO ASSET

The present application is a continuation of U.S. patent application Ser. No. 13/391,812, a submission under 35 U.S.C. §371 of International Application No. PCT/IB2010/052889, filed on 24 Jun. 2010 and published in the English language on 17 Mar. 2011 with publication no. WO 2011/030235 A1; which claims the benefit of the filing date of GB 0915661.3, filed 8 Sep. 2009.

FIELD OF THE INVENTION

The present invention relates to a method of delivering an audio video asset and to apparatus for planning delivery of an audio video asset.

BACKGROUND OF THE INVENTION

Increasingly, devices designed to enable the consumption of video content feature a large persistent store; and support both broadcast and networking technologies.

An operator wishing to make video content available to devices equipped with multiple reception capabilities has a number of transmission methods and technologies to choose from, including unicast (via a managed network or via the Internet), broadcast (via satellite, terrestrial or cable systems) or multicast (via a managed network).

Broadcast capability will generally involve leasing transponders for an agreed period. Unicast delivery via the Internet can be provisioned in a variety of ways, including deploying content servers in a suitable facility, making use of media hosting services, making content available via a pay-as-you-go 'cloud' service or enlisting the services of a regional or global content delivery network (CDN). Internet Protocol television (IPTV) multicast or video on demand (VOD) capability may exist if the provider is able to make use of a managed IP network, for example if delivering content to the customers of a single internet service provider (ISP).

Each of these mechanisms can be used to deliver content at varying rates and times relative to viewing. For example, content could be delivered by broadcast transmission over a period before viewing time (as is typically the case with broadcast push delivery), or could be delivered by unicast transmission at a higher rate commencing at viewing time (as is typically the case with progressive download).

Each approach incurs cost in different ways. For example, satellite transponders are normally leased for long periods for relatively large sums, typically millions of Euros annually, whereas a typical Internet based CDN charges for the delivery of video content on the basis of quantity delivered, typically a few cents per gigabyte (GB). Meanwhile, wholesale bandwidth purchased at a co-location facility is charged on the basis of peak utilization, typically tens of Euros per megabit per second (Mb/s).

The cost of delivery also depends on the nature of the delivery method. For example, content broadcast by satellite can be acquired by any tuner within its geographical footprint, typically a large area that may include millions of delivery destinations. By contrast, delivery from a CDN by unicast transmission requires a distinct copy of the content to be sent to each destination, causing delivery cost to increase proportionally with the number of viewers.

Each potential path between delivery source and destination has associated capacity bounding the content that can be delivered within a given time frame. For example, in the case of broadcast this capacity is determined by both the available transponder bandwidth and the number and type of tuners available at the destination. In the case of Internet or IPTV delivery this capacity is determined partly by broadband access connectivity but may also depend on one or more points of shared capacity between source and destination, for example an ISP's connectivity with the wider Internet.

Internet delivery resources are often provisioned by capacity on the basis of expected peak utilization. However, demands on capacity over time are rarely constant and thus resources are often underutilized during off-peak periods. Online video services such as the iPlayer (available from the British Broadcasting Corporation (BBC), United Kingdom) have been shown to exhibit a usage profile with a relatively high peak-to-mean ratio, similar to that of broadcast television viewing. Therefore, there is a relatively high likelihood of such capacity being used inefficiently for this type of service.

Each delivery to be made may be associated with business criteria such as delivery deadlines, priorities or cost targets.

CDN overlay networks are a technology focused on Internet delivery mechanisms, typically combining multiple CDNs and a peer-to-peer (P2P) capability of some kind (see http://blogs.gartner.com/lydia_leong/2008/10/21/cdn-overlays-and-more-on-mediamelon)

Minimizing the weighted sum of objective functions is a well known technique from the field of multiple objective optimization and used in situations where other types of optimization are computationally infeasible.

The following references are believed to represent the state of the art:
European Patent Application EP 1 476 992 to Mitsubishi Denki Kabushiki Kaisha;
United States Patent Application US 2008/0025222 to Nikolova et al.;
United Kingdom Patent Application GB 2 418 267 to QinetiQ Ltd.;
United States Patent Application US 2009/100459 to Riedl et al.;
European Patent EP 1 563 669 to Nokia Corporation;
International Patent Application WO2009/087550 to Alcatel Lucent;
U.S. Pat. No. 7,423,973 to Qualcomm, Inc.;
International Patent Application WO2006/072825 to Nortel Networks Limited; and
International Patent Application WO2009/076121 to Cisco Technology, Inc.

SUMMARY OF THE INVENTION

A problem facing the operator having capacity on multiple networks is how to execute deliveries to devices equipped with multiple reception capabilities in a way that makes best use of the different delivery mechanisms available, taking into account the factors described above, satisfying applicable business criteria and optimizing for often conflicting objectives such as cost and time.

There is provided in accordance with an embodiment of the present invention a method of delivering an audio video asset, the method including: receiving an order specifying an audio video asset to be delivered and a delivery destination for the audio video asset, wherein a delivery destination represents one or more physical delivery recipients; determining delivery paths representing different delivery technologies that could be used to deliver the audio video asset to the delivery destination; retrieving a set of path capacity timelines for the delivery paths, wherein path capacity timelines in the set of path capacity timelines each model a quantity of available capacity varying over time; processing the path capacity timelines to yield delivery path capacities; applying an allocation algorithm to the delivery path capacities to yield candidate delivery allocations, wherein candidate delivery allocations each include one or more time periods during which one or more time periods a defined quantity of capacity can be allocated for delivery of the audio video asset; applying a cost function to the candidate delivery allocations to yield cost values, wherein the cost values each represent a cost of delivering the audio video asset according to the candidate delivery allocations; calculating scores for the candidate delivery allocations in dependence on a cost value for that candidate delivery allocation and one or more other objectives; selecting a candidate delivery allocation having a lowest score to yield a selected candidate delivery allocation; and delivering the audio video asset according to the selected candidate delivery allocation.

Further, in accordance with an embodiment of the present invention, the order further specifies a criterion concerning a way in which the order is to be fulfilled.

Still further, in accordance with an embodiment of the present invention, the criterion includes a time window within which the audio video asset is to be delivered.

Additionally, in accordance with an embodiment of the present invention, the criterion includes a priority flag indicating that delivery of the audio video asset is to be considered a priority relative to delivery of other audio video assets.

Moreover, in accordance with an embodiment of the present invention, the determining delivery paths includes: for each delivery path, matching a delivery sink associated with a delivery capability to a delivery source represented by a delivery option according to one or more criteria of a delivery scheme representing a delivery technology.

Further, in accordance with an embodiment of the present invention, the determining delivery paths further includes removing delivery paths that do not satisfy rules governing use of delivery options with delivery destinations.

Still further, in accordance with an embodiment of the present invention, the retrieving the set of path capacity timelines includes: for each delivery path, retrieving a path capacity timeline associated with the delivery destination option and a path capacity timeline associated with the delivery destination.

Additionally, in accordance with an embodiment of the present invention, the retrieving the set of path capacity timelines further includes: for each delivery path, retrieving a path capacity timeline associated with the delivery scheme.

Moreover, in accordance with an embodiment of the present invention, the retrieving the set of path capacity timelines further includes: for each delivery path, determining whether the delivery destination has any child destinations and examining any child destinations for further child destinations until a leaf destination is identified; and retrieving a path capacity timeline associated with the leaf destination.

Further, in accordance with an embodiment of the present invention, the processing of the path capacity timelines includes: performing a minimization function over each set of path capacity timelines.

Still further, in accordance with an embodiment of the present invention, the allocation algorithm allocates capacity as early as possible within a limit of available capacity specified by a delivery path capacity, and the capacity to be allocated is calculated from a size of the audio video asset to be delivered and a number of physical delivery recipients.

Additionally, in accordance with an embodiment of the present invention, the allocation algorithm allocates capacity over a period proportional to a defined peak capacity to mean capacity ratio and a defined peak capacity period, and the capacity to be allocated is calculated from a size of the audio video asset to be delivered, a number of physical delivery recipients, and a likelihood of the audio video asset being viewed, wherein the likelihood of the audio video asset being viewed is derived from content viewing statistics.

Moreover, in accordance with an embodiment of the present invention, the allocation algorithm: identifies existing allocations for the audio video asset to be delivered; if existing allocation exists, allocates capacity congruent with the existing allocation; and otherwise allocates capacity as early as possible within a limit of available capacity specified by a delivery path capacity; wherein the capacity to be allocated is calculated from a duration and an encoded bitrate of the audio video asset to be delivered.

Further, in accordance with an embodiment of the present invention, the allocation algorithm is parameterised with one or more time windows representing one or more time periods, and one candidate delivery allocation is returned for each of the one or more time periods.

Still further, in accordance with an embodiment of the present invention, each candidate delivery allocation includes more than one contiguous time period.

Additionally, the cost function is parameterised with a time period and a plurality of capacity bands, capacity bands in the plurality of capacity bands being associated with cost factors, and the cost function identifies a set of peak capacity values in a delivery path capacity at regular intervals over a fixed period, discards a greatest 5% of peak capacity values in the set of peak capacity values, selects a next greatest peak capacity value to be a peak capacity value for the fixed period, determines a cost for the fixed period by multiplying the peak capacity value for the fixed period by a cost factor determined by reference to a capacity band, and determines a cost value for a candidate delivery allocation as a function of usage represented by the candidate delivery allocation and a cost for the fixed period.

Moreover, in accordance with an embodiment of the present invention, the cost function is further parameterised with time periods, time periods each being associated with capacity bands and a cost factor, wherein cost for an overall period is calculated as a weighted sum of each time period.

Further, in accordance with an embodiment of the present invention, the cost function is parameterised with a time period and a plurality of capacity bands, capacity bands in the plurality of capacity bands each being associated with a cost factor, and calculates data delivered within a fixed period including the candidate delivery allocation, determines a cost factor by reference to a capacity band, and calculates a cost value for the candidate delivery allocation as a function of the data and the cost factor.

Still further, in accordance with an embodiment of the present invention, the cost function is further parameterised with time periods, time periods each being associated with capacity bands and a cost factor, and a relevant cost factor is determined by reference to both the quantity bands and time period.

Additionally, the cost function is parameterised with a cost factor and a time period, and calculates usage represented by the delivery candidate allocation as a proportion of total capacity over the time period, and calculates a cost value for the candidate delivery allocation as a function of the proportion and the cost factor.

Moreover, in accordance with an embodiment of the present invention, the one or more other objectives include: minimizing cost; or minimizing time until completion of delivery of the audio video asset; or minimizing duration of delivery of the audio video asset.

Further, in accordance with an embodiment of the present invention, the calculating scores for the candidate delivery allocations includes: for the one or more other objectives, retrieving an objective weight, and modifying a normalized value for the objective by multiplying the normalized value by the objective weight, thereby yielding a set of weighted values; and summing the set of weighted values to yield the score.

There is also provided in accordance with a further embodiment of the present invention apparatus for planning delivery of an audio video asset, the apparatus including: means for receiving an order specifying an audio video asset to be delivered and a delivery destination for the audio video asset, wherein a delivery destination represents one or more physical delivery recipients; means for determining delivery paths representing different delivery technologies that could be used to deliver the audio video asset to the delivery destination; means for retrieving a set of path capacity timelines for the delivery paths, wherein path capacity timelines in the set of path capacity timelines each model a quantity of available capacity varying over time; means for processing the path capacity timelines to yield one or more delivery path capacities; means for applying an allocation algorithm to the delivery path capacities to yield candidate delivery allocations, wherein candidate delivery allocations each include one or more time periods during which one or more time periods a defined quantity of capacity can be allocated for delivery of the audio video asset; means for applying a cost function to the candidate delivery allocations to yield cost values, wherein the cost values each represent a cost of delivering the audio video asset according to the candidate delivery allocations; means for calculating scores for the candidate delivery allocations in dependence on a cost value for that candidate delivery allocation and one or more other objectives; means for selecting a candidate delivery allocation having a lowest score to yield a selected candidate delivery allocation; and means for delivering the audio video asset according to the selected candidate delivery allocation.

BRIEF DESCRIPTION OF THE DRAWINGS

The present invention will be understood and appreciated more fully from the following detailed description, taken in conjunction with the drawings in which:

FIG. 3 is a simplified pictorial illustration of asset orders in accordance with embodiments of the present invention;

FIG. 5 is a simplified pictorial illustration of delivery paths determined in accordance with embodiments of the present invention;

FIGS. 8 and 9 are simplified pictorial illustrations of how capacity timelines are processed in accordance with embodiments of the present invention;

FIG. 19 is a simplified pictorial illustration of scored candidate allocations according to embodiments of the present invention.

DETAILED DESCRIPTION OF AN EMBODIMENT

Figure 1:
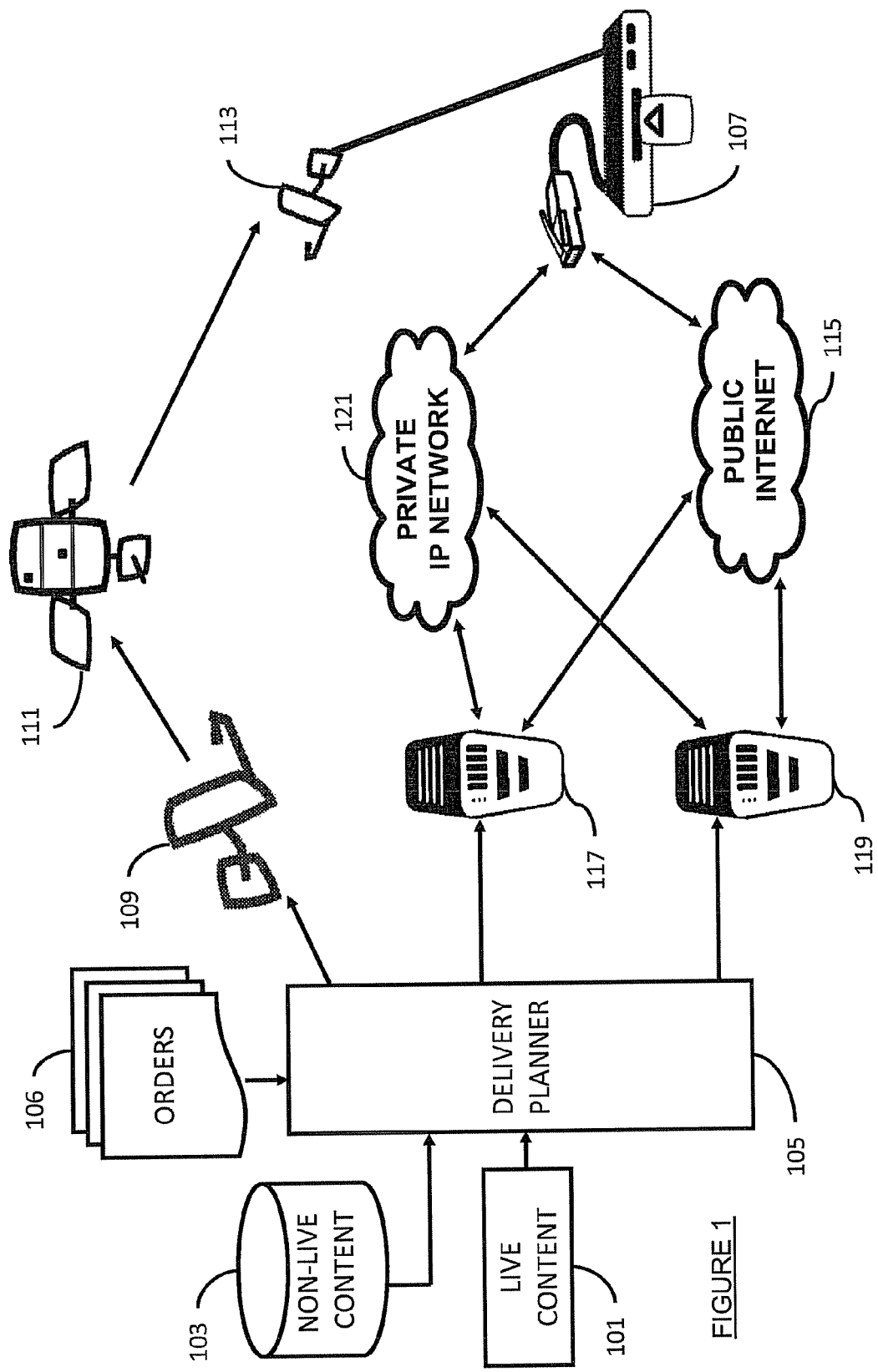
FIG. 1 is a simplified pictorial illustration of a system constructed and operative in accordance with embodiments of the present invention.

According to embodiments of the present invention, different delivery technologies, such as satellite broadcast or Internet delivery, are each represented in a system by a scheme. Each scheme defines the prototypical elements of a delivery path using that technology. These elements include sources and sinks, such as satellite transponders and satellite tuners in the case of broadcast delivery; or streaming media servers and network interfaces in the case of Internet delivery. In addition, each scheme defines different ways in which capacity may be allocated and costed.

The system is configured with one or more delivery options, each delivery option representing a delivery source from one scheme and associated with one or more allocation and costing algorithms specific to that scheme.

The system is also configured with a number of delivery destinations, each delivery destination representing one or more physical delivery recipients. Delivery destinations are arranged into hierarchies such that broad population segments can be addressed efficiently. For example, a destination representing "Households with Children" may be configured with two child destinations "London region" and "Manchester region" enabling any of these three sets of physical delivery recipients to be addressed separately. Delivery destinations are associated with a number of capabilities, each representing a delivery sink from one scheme.

The system is further configured with a number of capacity timelines. Each capacity timeline models a quantity of available capacity varying over time, for example Mb/s over a 48 hour period. One capacity timeline is associated with each delivery option and at least one capacity timeline is associated with each delivery destination. In addition, a capacity timeline may be associated with more than one delivery destination. The nature of the association between a capacity timeline and a delivery option or delivery destination is specific to a scheme. For example, a delivery destination may have two capacity timelines associated with a sink from an Internet delivery scheme, one representing broadband access capacity and another representing capacity within a particular ISP network.

It is to be noted that by configuring the available capacity in this way, the platform is able to exercise control over the load that will be incurred on a range of delivery resources, both those directly under the control of the platform and those under the control of third parties.

The system is also configured with rules governing the use of delivery options with delivery destinations. For example, it may be desirable to restrict the use of a delivery option representing a streaming media server to delivery destinations residing in a particular IP address space.

The system is further configured with a number of heuristics that enable the comparison of candidate delivery allocations made in accordance with different schemes against multiple objectives. For example, one heuristic may seek to minimize cost while another seeks to minimize delivery completion time. These heuristics are configured with weights reflecting their relative importance to the platform.

In addition to the configured model elements described above, the system is also given access to a body of data detailing content viewing statistics. This data may be captured directly from users of the platform via a suitable audience measurement system or supplied from an external source such as the Broadcasters' Audience Research Board (BARB) or Nielsen Ratings.

Referring to FIG. 1, a system according to an embodiment of the present invention is shown. Audio video content assets (both live content 101 and non-live content 103) is ingested by a platform's delivery planner 105 along with orders 106 for those assets received from a platform's subscriber's in-home content storage device 107. The audio video content assets can be delivered to storage device 107 in a number of different ways. For example, via a satellite broadcast network utilising satellite uplink 109, satellite transponder 111 and satellite dish and satellite tuner 113. Or via the public internet 115 utilising a data centre 117 (also called a media server or download server) or a CDN 119 (also called a streaming server) and a network interface. Other delivery routes will be apparent to someone skilled in the art, including those using a private (managed) IP network 121.

Figure 2:
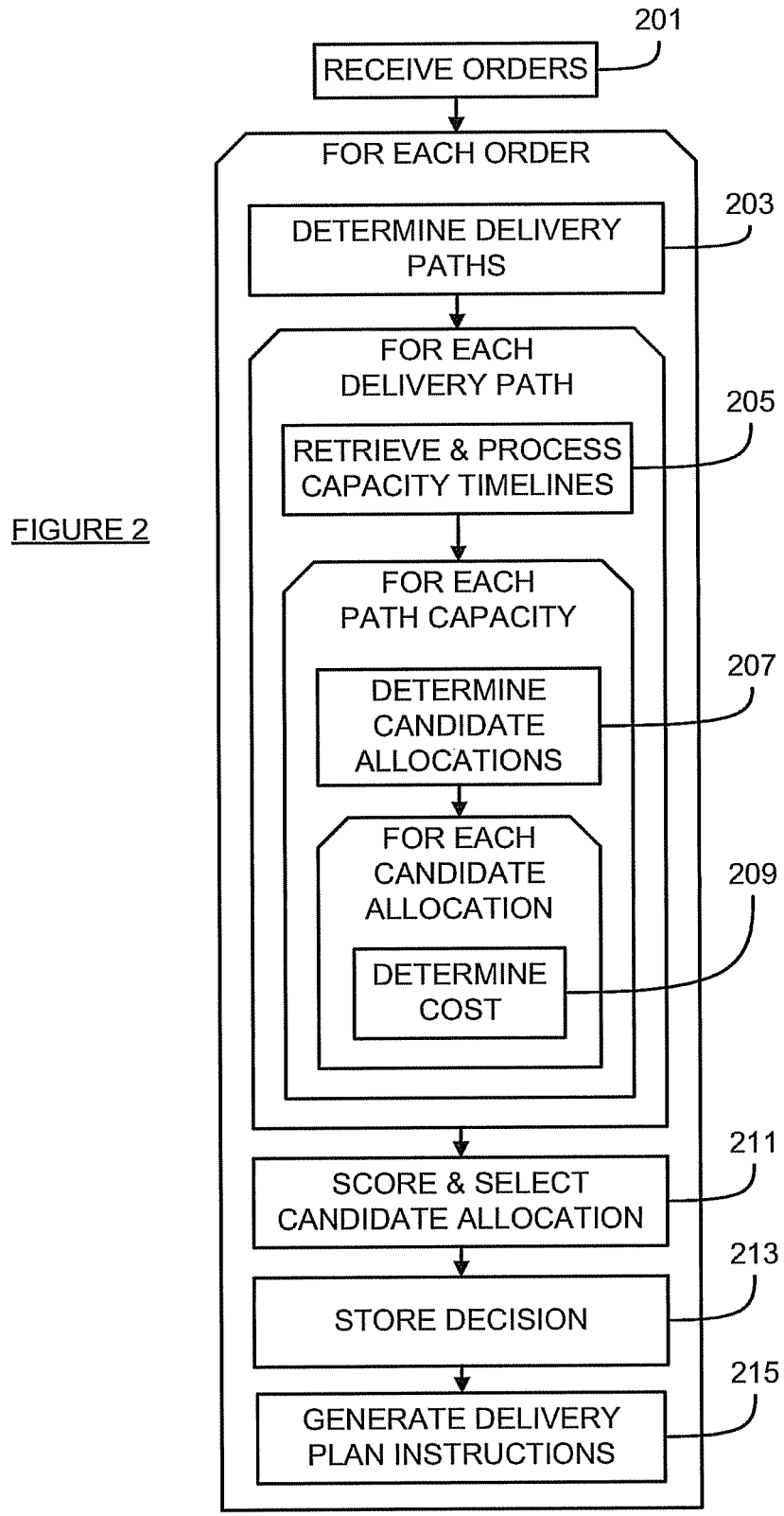
FIG. 2 is a flow chart of a method operative by the system of FIG. 1 according to embodiments of the present invention.

Referring now to FIG. 2, and according to an embodiment of the present invention, delivery planner 105 carries out a series of steps that operate on a model of the delivery resources available to a platform. As mentioned previously, different delivery technologies are organized into schemes, each scheme being associated with a variety of delivery resource types, allocation algorithms and cost functions. Capacity timelines are assigned to resources and rules are specified concerning how resources may be used. Heuristics are defined that enable the comparison of potential delivery solutions using different schemes.

Delivery tasks are received by the system as orders (step 201), each order specifying an asset to be scheduled for delivery, a delivery destination and any criteria to be adhered to. For each order, a set of possible delivery paths is determined (step 203). For each delivery path, an applicable set of capacity timelines is retrieved and processed (step 205) yielding a delivery path capacity. For each path capacity, an allocation algorithm is applied based on the associated scheme to yield zero or more candidate delivery allocations (step 207). For each candidate delivery allocation, a cost function is applied based on the associated scheme, yielding zero or more costed candidate delivery allocations for each delivery path (step 209). Once all delivery paths have been processed, each candidate allocation is scored via heuristics that evaluate relative cost, schedule and compliance with any criteria and one candidate allocation is selected from the set of candidate allocations (step 211). Finally, the relevant capacity timelines are updated to reflect the selected allocation, the decision is stored (step 213) and instructions are generated for the execution of the delivery (step 215).

In this way the delivery decision for one or more orders can be locally optimized for multiple factors including but not limited to the capacity available across different delivery mechanisms, the cost incurred by their use, the time of delivery and other criteria.

Each of the above described steps will now be described in more detail below.

Delivery tasks are received by the system as orders (step 201). Each order specifies the assets to be delivered and the delivery destination, as shown, for example, in FIG. 3. In addition, each order may specify criteria in the form of constraints or preferences concerning the way in which the order is fulfilled. An example of a constraint is a time window within which a delivery must be completed. An example of a preference is a priority flag, indicating that the delivery should be considered a priority relative to other deliveries. Orders are typically processed by the system in batches. In each batch, the system typically combines orders together where intersections exist in terms of assets, destinations and criteria.

Figure 4:
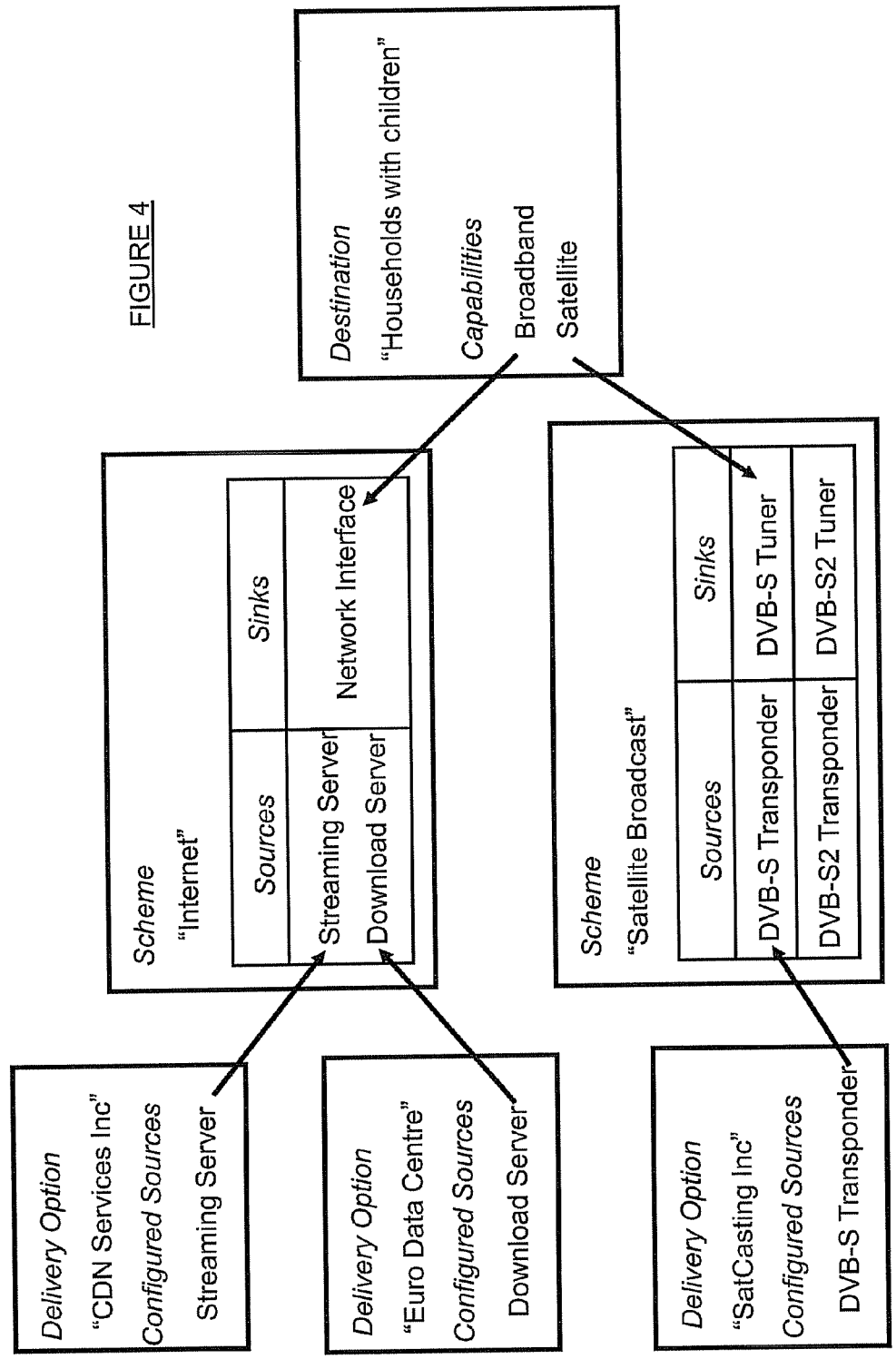
FIG. 4 is a simplified pictorial illustration of how delivery paths are determined in accordance with embodiments of the present invention.

For each order, the system determines the set of delivery paths that can be used to deliver the assets to the destination specified (step 203). Referring to FIG. 4, the delivery sinks (e.g. network interface; DVB-S tuner; DVB-S2 tuner) associated with the capabilities (e.g. broadband; satellite) configured for the destination (e.g. households with children) are matched with delivery sources (e.g. streaming server; download server; DVB-S transponder; DVB-S2 transponder) according to scheme specific criteria. For example, a satellite broadcast scheme will match a DVB-S tuner to a DVB-S transponder but not to a DVB-S2 transponder; and an internet scheme will match a streaming server and a download server to a network interface. Then the delivery options (e.g. "CDN Services Inc."; "Euro Data Centre"; "SatCasting Inc.") configured for those delivery sources are retrieved. From this a set of paths is generated, each path consisting of a delivery option, destination, capability and scheme. For example, three such paths are shown in FIG. 5. The resulting set of delivery paths can be reduced by removing those that do not satisfy configured rules governing the use of delivery options with delivery destinations. As an example, for business reasons a rule might be configured to specify that the destination must not make use of "CDN Services Inc." therefore removing the third path from the set described above.

For each delivery path under consideration, the system determines the path capacity (step 205). Firstly, the capacity timelines associated with the delivery path are retrieved. For each delivery path there are a minimum of two capacity timelines—one associated with the delivery option and one or more associated with the delivery destination or scheme.

Figure 6:
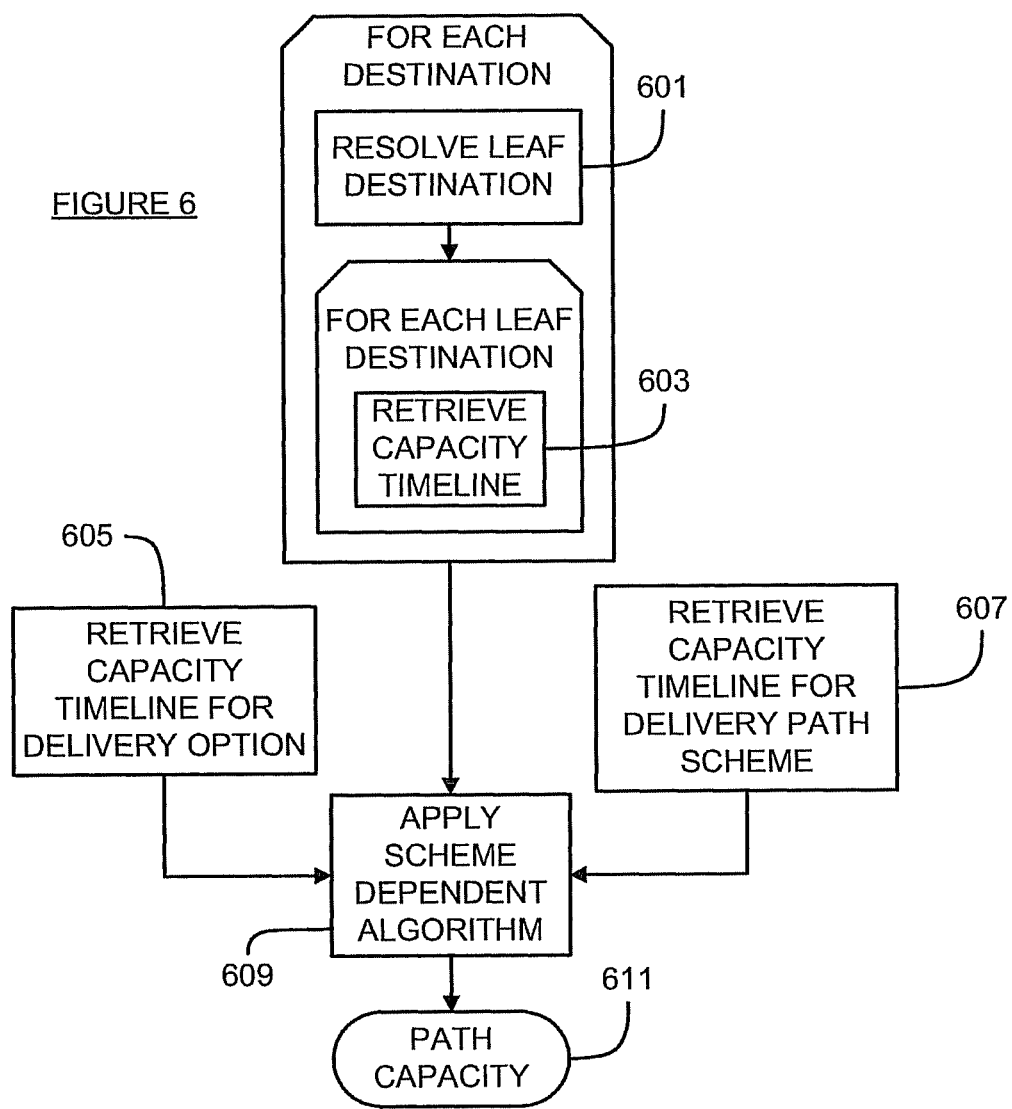
FIG. 6 is a flow chart of a capacity timeline processing method according to embodiments of the present invention.
Figure 7:
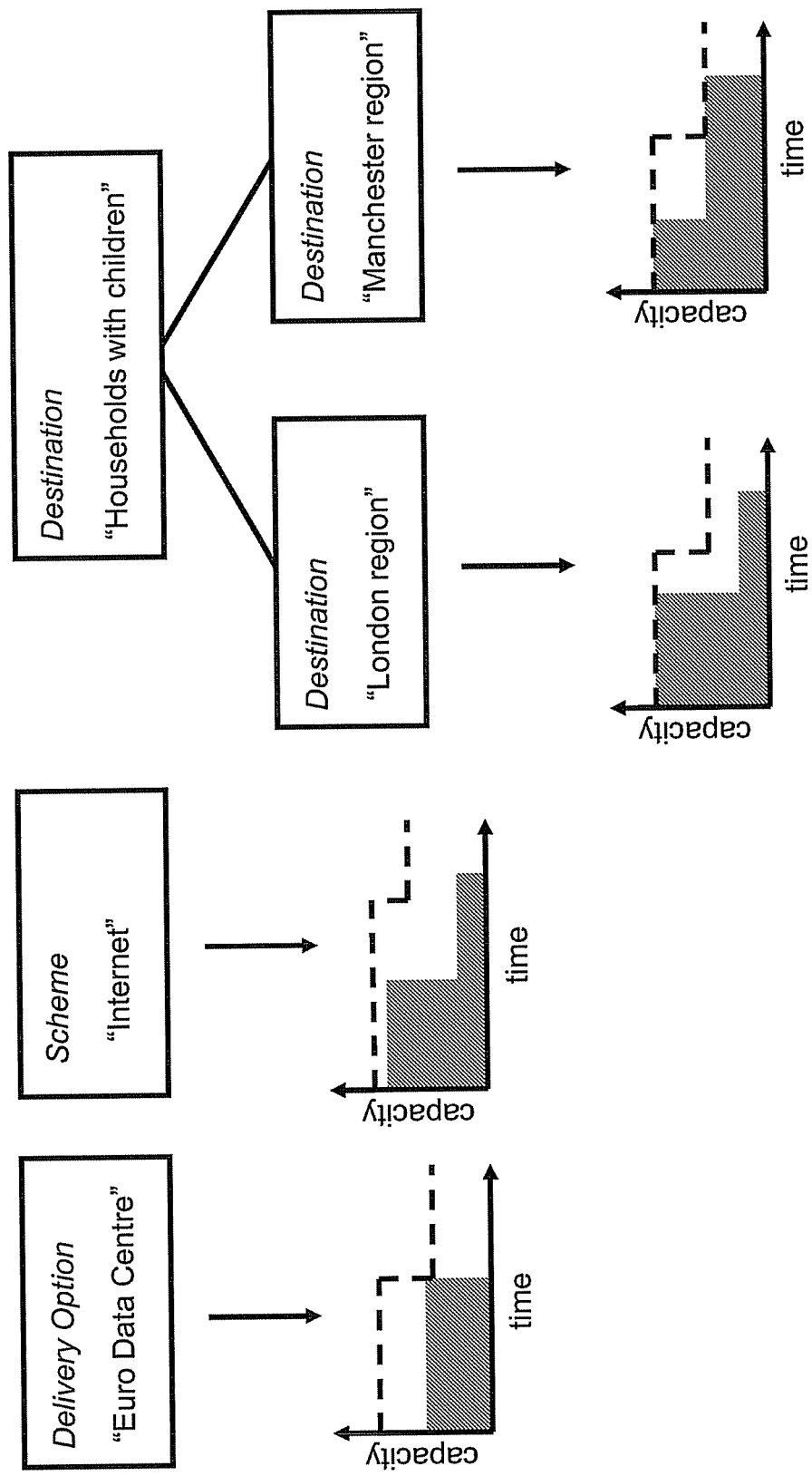
FIG. 7 is a simplified pictorial illustration of the retrieval of capacity timelines in accordance with embodiments of the present invention.

Referring now to FIG. 6, in order to resolve the capacity timelines for the delivery destination, the system first determines whether the destination has any child destinations. If so, these child destinations are themselves examined for children and so on until leaf destinations are identified (step 601). The system then retrieves the capacity timelines associated with these leaf destinations (step 603). Additional capacity timelines are retrieved for the delivery option (step 605) and/or may also be retrieved for the delivery path scheme (step 607). An example is shown in FIG. 7 where capacity timelines are retrieved for delivery option "Euro Data Centre", scheme "Internet", and each leaf destination "London region" and "Manchester region". Each capacity timeline plots (as a dotted line) a configured limit that is placed on the available capacity over time. The capacity that has already been used is shown by shading.

A scheme dependent algorithm then processes the retrieved capacity timelines (step 609) resulting in a delivery path capacity (a processed capacity timeline for the delivery path).

For most schemes (e.g. an Internet delivery scheme), the delivery path capacity can be calculated by performing a minimization or maximization function over the set of retrieved capacity timelines (in order to calculate available, unused capacity one can minimize the available capacity or maximize the unavailable capacity and subsequently compare with the capacity limit). FIG. 8 shows used, unavailable capacity being 'added' together to produce a resulting processed capacity timeline with a capacity limit 801, an area of used, unavailable capacity 803 and an area of unused, available capacity 805.

For some schemes (e.g. a satellite broadcast scheme), an alternative delivery path capacity calculation is typically used due to constraints on the possible capacity values of leaf destination timelines. These constraints are due to the fact that a satellite tuner is typically used all-or-nothing. That is to say, after tuning, the client of the satellite tuner can choose to use 3 Mbps, 7 Mbps or any other figure but the full theoretical capacity (51.6 Mbps but typically only 33 Mbps for DVB-S) will still be delivered to the tuner. Therefore, whilst the tuner is tuned to a satellite multiplex on a particular frequency, that tuner cannot receive content from a satellite multiplex on any other frequency. The minimum is further constrained to be the least common multiple of the tuner capacity. For example with two tuners (typically providing a total capacity of 66 Mbps) the possible capacity values are 66 Mbps, 33 Mbps and 0 Mbps. Referring to FIG. 9, an asset to be delivered 901 is already scheduled for broadcast on the transponder associated with SatCasting Inc. The tuner associated with 'london region' is scheduled to be tuned to the transponder associated with SatCasting Inc. for a period of time 903. The tuner associated with 'london region' is also scheduled to be tuned to some other transponder for a period of time 905. The resulting processed capacity timeline therefore shows:

- the existing scheduled broadcast of the asset to be delivered on the SatCasting Inc. transponder 907. This capacity can be allocated to deliver the asset (in contrast with an Internet delivery scheme where this capacity would be designated as used capacity and therefore would be unavailable for delivering the asset—a difference between unicast and broadcast transmission;
- a commitment to other scheduled broadcasts to be delivered on the SatCasting Inc. transponder 909. This capacity cannot be allocated to deliver the asset.
- a commitment to some other transponder 911. Nothing can be delivered from the SatCasting Inc. transponder during this period since tuners can only be tuned to one frequency at a time.

It is to be noted that FIG. 9 shows 'logical' usage incurred by assets. During the period that the existing scheduled broadcast for the asset appears, the tuner is already committed to the transponder in question and may be recording some other asset. In order to make use of the striped, existing allocation the client would need to be capable of recording at least two items at once from the same transponder. Otherwise the earliest delivery will be immediately to the right of the entire shaded area. However, this logic is the responsibility of the allocation algorithm from the satellite broadcast scheme—the output of this stage is simply a statement of fact regarding available capacity over time for this delivery path.

For each delivery path capacity, the system produces one or more candidate delivery allocations (step 207), each allocation consisting of one or more time periods during which a defined quantity of capacity can be allocated.

Figure 10:
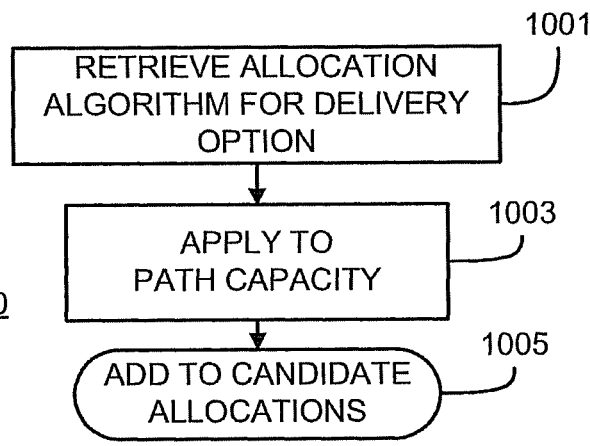
FIG. 10 is a flow chart of a method of applying an allocation algorithm to a path capacity according to embodiments of the present invention.

Referring now to FIG. 10, for the delivery path capacity under consideration, the allocation algorithm associated with delivery option for that delivery path is retrieved (step 1001). This algorithm will be one of several such algorithms defined by the associated scheme and is set during configuration according to the nature of the delivery option. The allocation algorithm is then applied to the delivery path capacity (step 1003) and a candidate allocation is produced and added to a list of candidate allocations to be processed (step 1005).

Allocation algorithms differ in the way in which capacity is allocated and the factors which influence that allocation. The purpose of this stage (step 207) is to produce a range of feasible candidate delivery allocations within constraints for later consideration on the basis of more general criteria such as priority or cost. Different non-limiting examples of allocation algorithms will now be described with reference to FIGS. 11 to 15.

Figure 11:
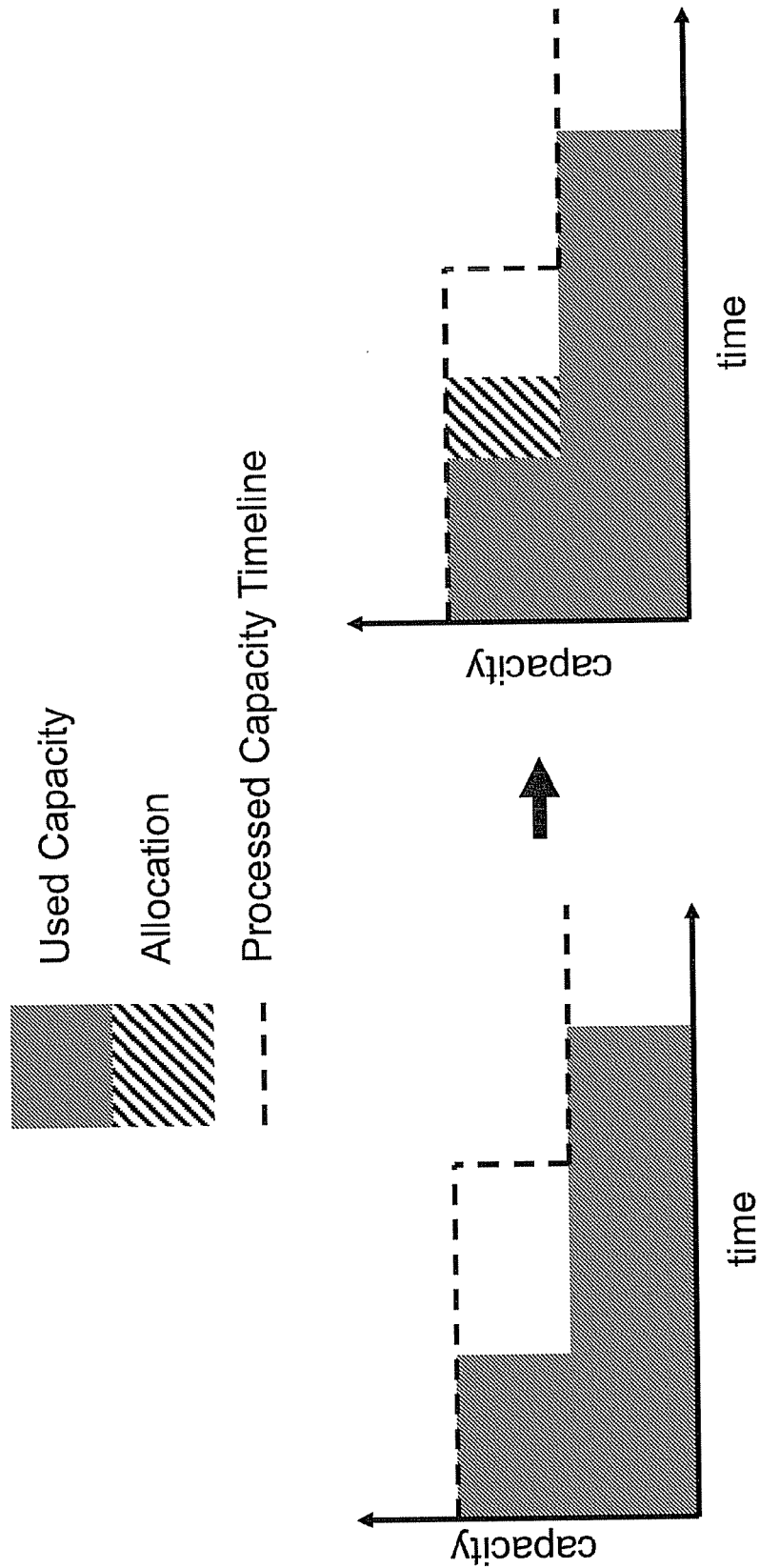
FIGS. 11 to 15 are simplified pictorial illustrations of allocation algorithms according to embodiments of the present invention.

An allocation algorithm for an Internet delivery scheme intended for scheduled delivery of assets allocates capacity as early as possible within the limit of available capacity specified by the processed capacity timeline (as shown in FIG. 11). The quantity of capacity required for delivery is calculated directly from the asset sizes and number of physical delivery recipients.

Figure 12:
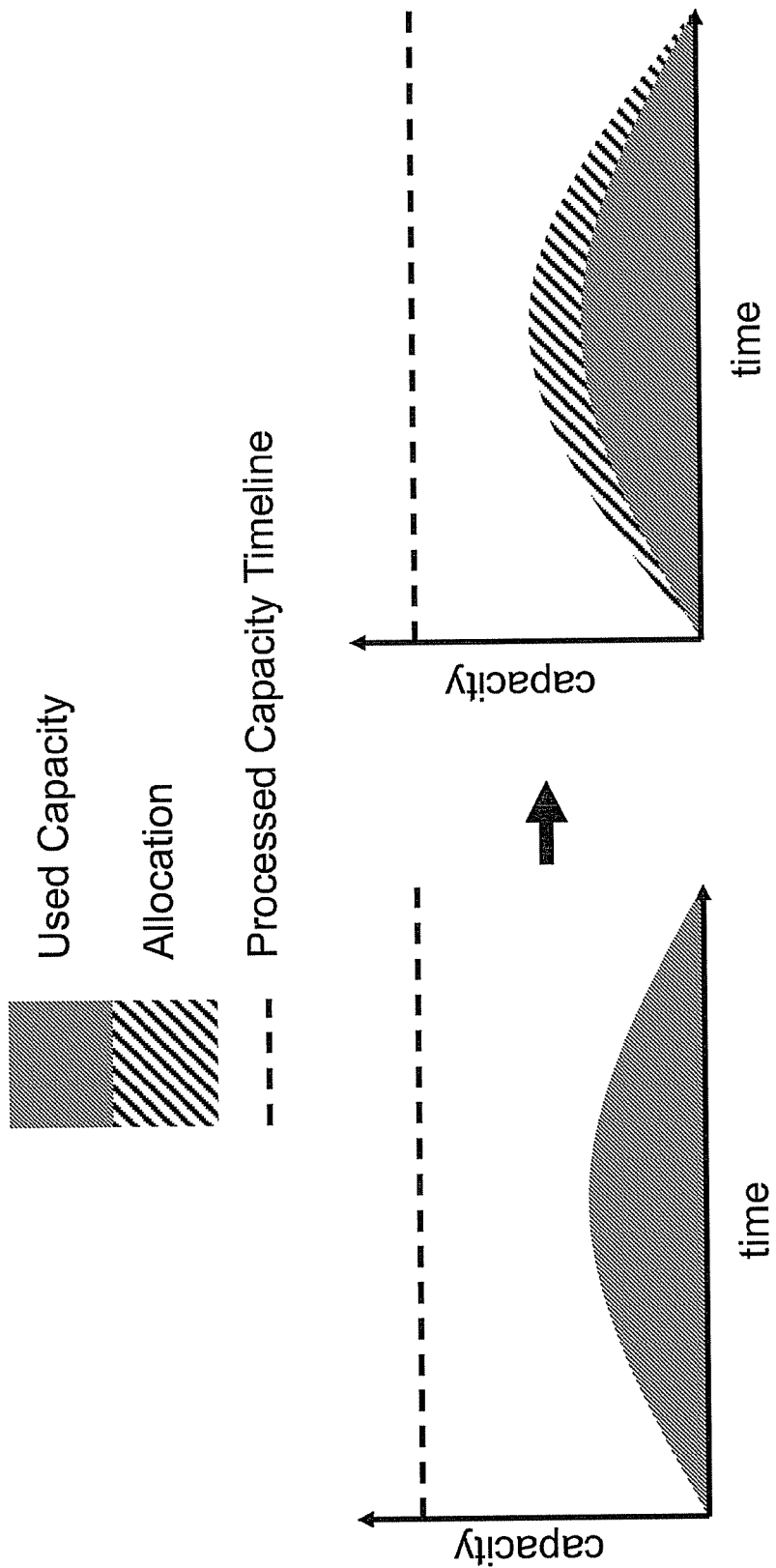

Another allocation algorithm for an Internet delivery scheme intended for on demand delivery of assets allocates capacity over a period proportional to a defined peak to mean ratio and defined peak period (as shown in FIG. 12). The quantity of capacity required for delivery is calculated from the asset sizes, the number of physical delivery recipients and the likelihood of those assets being viewed. The likelihood of assets being viewed is derived from content viewing statistics made available to the system during configuration. It is to be noted that a capacity timeline used in this way represents a probabilistic distribution of load over time rather than an indicative plan for capacity usage.

Figure 13:
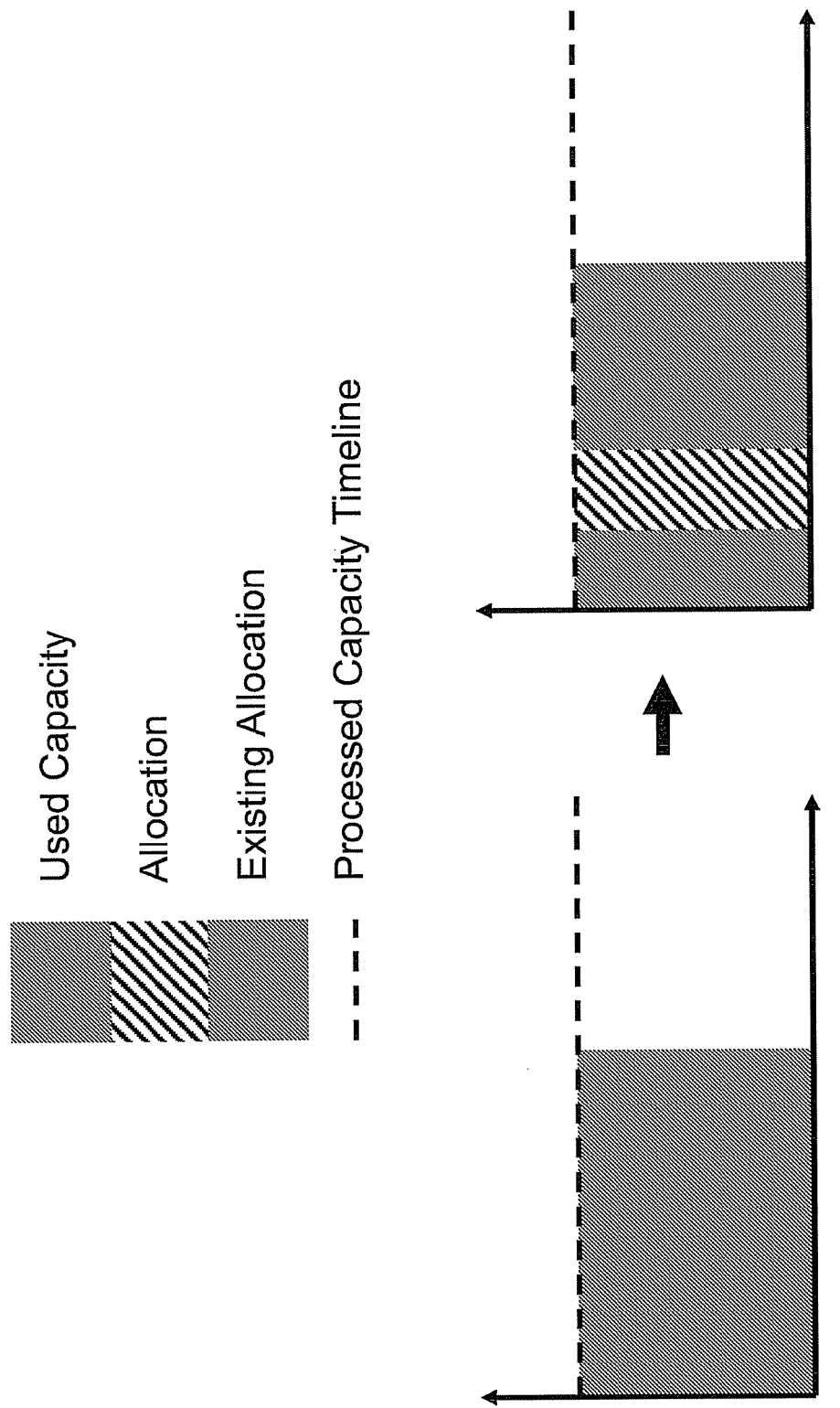

A further allocation algorithm from a satellite broadcast delivery scheme first identifies existing allocations for the assets specified in the order. If no existing allocations exist, the algorithm then allocates capacity as early as possible within the limit of available capacity specified by the processed capacity timeline. If an existing allocation for the assets specified in the order does exist, capacity is allocated congruent with the existing allocation (as shown in FIG. 13). The quantity of capacity required for delivery is calculated from the duration and encoded bitrate of the assets. It is to be noted that a candidate allocation created congruent to an existing allocation uses no additional capacity from the capacity timeline associated with the delivery option. It is to be further noted that this type of allocation algorithm assumes that the delivery technology in use permits the destination to acquire more than one item simultaneously from the delivery option. In a situation where a satellite broadcast tuner can only be used to acquire one item during a given time period, this allocation algorithm is modified to allocate the capacity for the asset duration instead of using the encoded bitrate.

Figure 14:
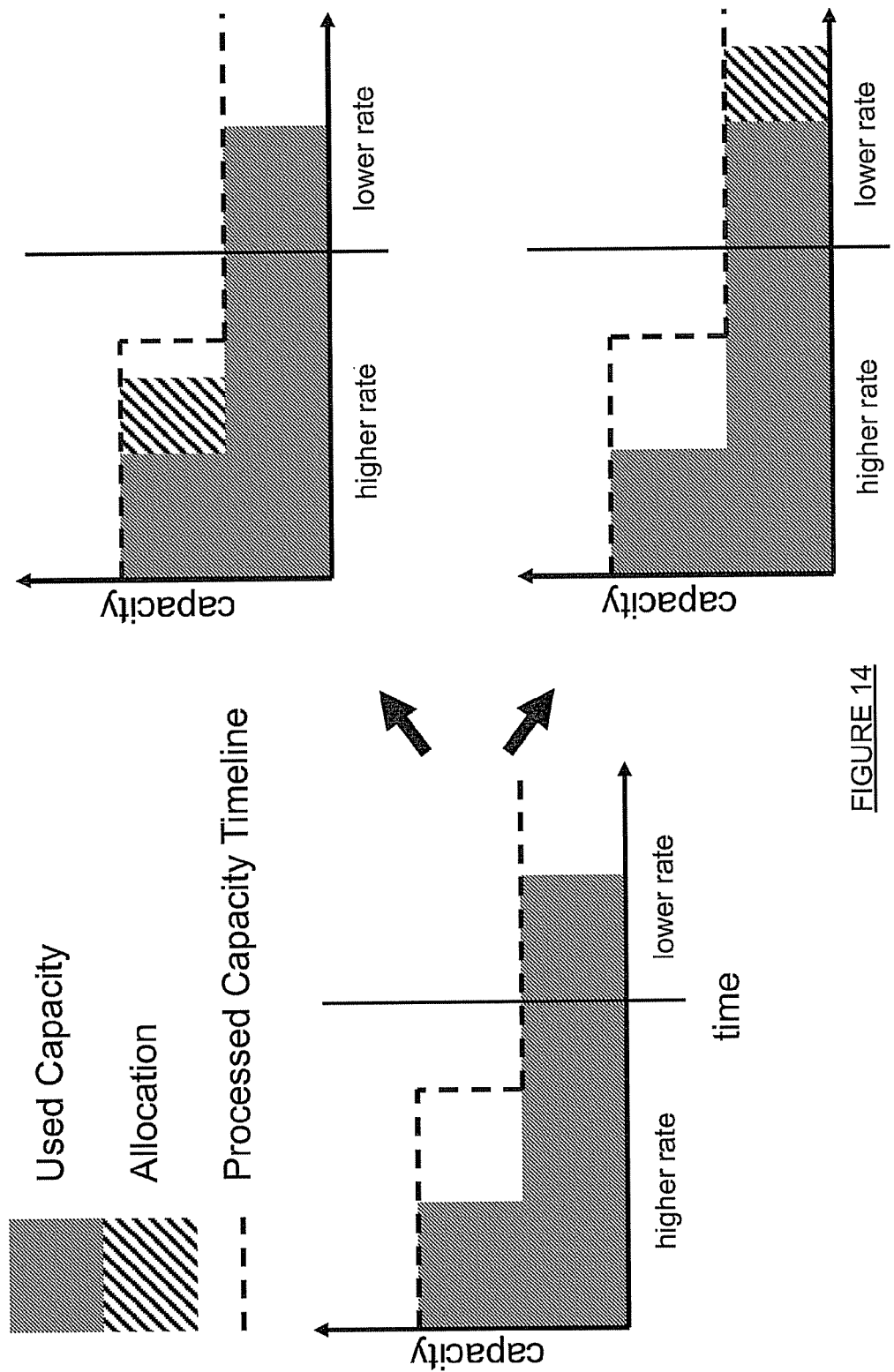

Variants of the allocation algorithms described above can be influenced by cost factors. An allocation algorithm for an Internet delivery scheme intended for scheduled delivery of assets can be parameterized with one or more time windows, with one candidate allocation being returned for each period (as shown in FIG. 14). This can be used to reflect scenarios in which the cost of delivering assets varies with time of day.

Figure 15:
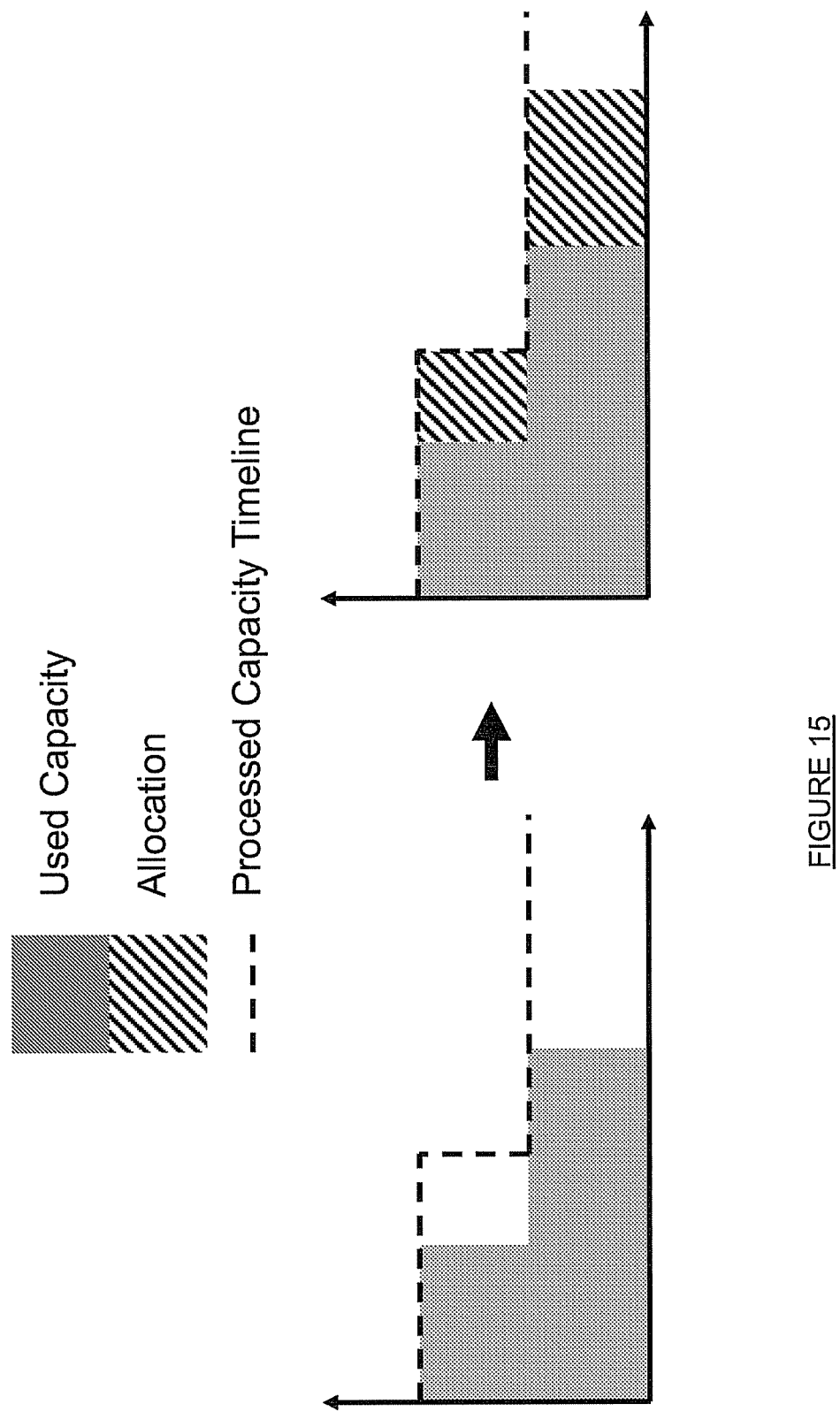

It is to be noted that in addition to yielding multiple allocations, each allocation may itself consist of more than one contiguous period (as shown in FIG. 15). This can arise, for example, where for a given period, the allocation to be made is larger than the first or indeed any one period of free capacity. Whether multiple periods may be returned depends upon the allocation algorithm—it may be reasonable for scheduled Internet delivery to divide delivery of a given order over several periods, while it may be a matter of policy not to allow this for satellite broadcast delivery.

For each candidate allocation the system generates an associated cost (step 209).

Figure 16:
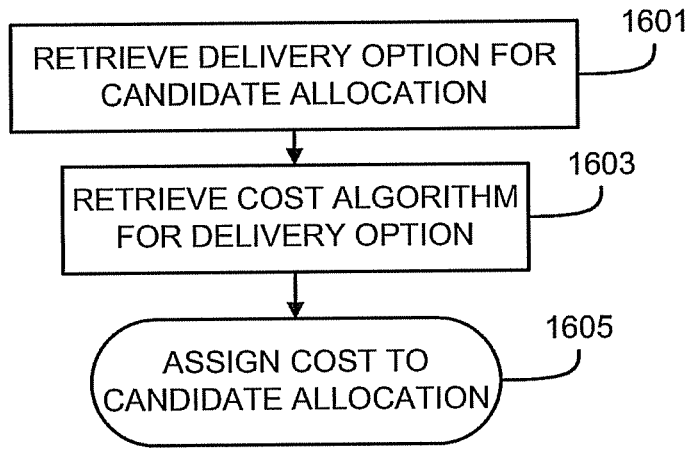
FIG. 16 is a flow chart of a method of assigning a cost to a candidate allocation according to embodiments of the present invention.

Referring to FIG. 16, for the candidate allocation under consideration, the delivery option is retrieved (step 1601). The cost function associated with the retrieved delivery option is then retrieved (step 1603). This cost function will be one of several such cost functions defined by the associated scheme and is set during configuration according to the nature of the delivery option. The retrieved cost function is then applied to the candidate allocation and cost is assigned to the candidate allocation (step 1605).

Cost functions reflect the way in which usage of capacity associated with a delivery option incurs cost to the platform. As well as varying by scheme and by mode of use, these costs typically also depend on commercial agreements.

An example of a cost function for an Internet delivery scheme calculates cost based on $95^{th}$ percentile capacity usage. The cost function is parameterized with a time period and a number of capacity bands, each capacity band being associated with a cost factor. The function identifies the set of peak capacity values in a capacity timeline at regular intervals over a fixed period. The greatest 5% of these values are discarded and the next highest value is considered the capacity usage value for that fixed period. The relevant cost factor is determined by reference to the capacity bands and the cost for that fixed period is calculated by multiplying this cost factor by the capacity usage value. Allocation cost is then calculated as a function of the usage represented by that allocation and the cost for that period.

A variant of the above described cost function calculates cost based on $95^{th}$ percentile capacity where different rates are applied at different times of day. The function is parameterized with more than one time period, each being associated with capacity bands and cost factors as above. Firstly, cost for each time period is calculated as described above using the cost factor associated with the capacity band and time period. Cost for the overall period is calculated as the weighted sum of each individual time period.

A further example of a cost function for an Internet delivery scheme calculates cost based on the quantity of data delivered. The function is parameterized with a time period and a number of quantity bands, each being associated with a cost factor. The data delivered within a fixed period including the candidate allocation is calculated and the relevant cost factor determined by reference to the quantity bands. Allocation cost is then calculated as a function of the data delivered by that allocation and the cost factor. A variant of this cost function calculates cost based on data delivered where different rates are applied at different times of day. The function is parameterized with more than one time period, each being associated with quantity bands and cost factors as described above. The data delivered is calculated as described above and the relevant cost factor is determined by reference to both the quantity bands and time period.

An example of a cost function for a broadcast delivery scheme calculates cost based on proportional resource usage. The function is parameterized with a cost factor and time period. Usage represented by the candidate allocation is calculated as a proportion of total capacity over that period. Allocation cost is then calculated as a function of this proportion and the cost factor.

Figure 17:
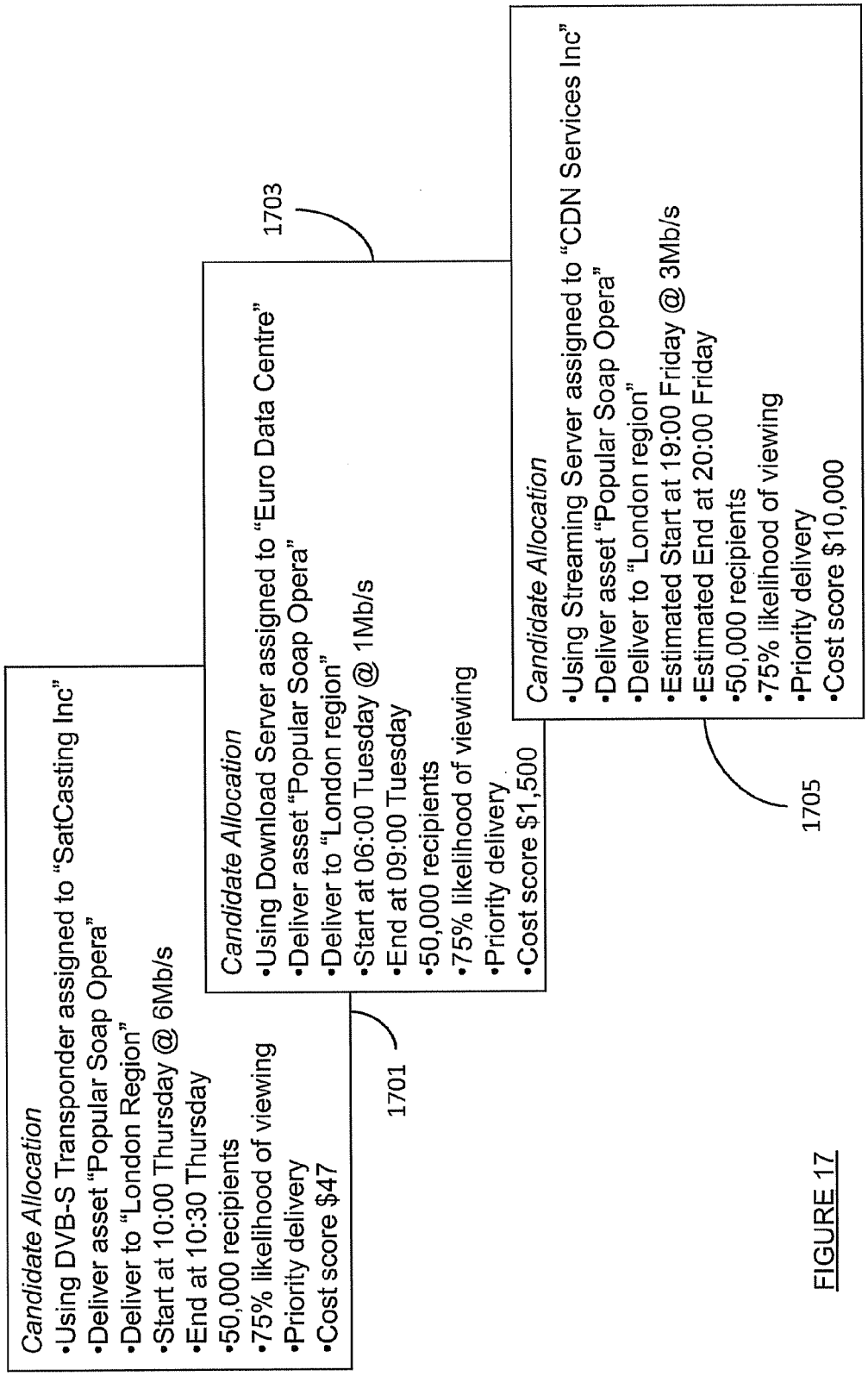
FIG. 17 is a simplified pictorial illustration of candidate allocations according to embodiments of the present invention.

The system now has a number of candidate allocations using a range of delivery options associated with an order. Each candidate allocation represents one way of fulfilling the order within the capacity constraints of a delivery path. Several groups of candidates may exist for a given order if that order indirectly addresses more than one destination. As shown in FIG. 17, each candidate allocation (1701, 1703, 1705) has a number of attributes that include one or more scheduled periods of asset delivery and a cost score.

Candidate allocation 1701 makes use of a DVB-S transponder assigned to the delivery option entitled 'SatCasting Inc'. The asset to be delivered is 'Popular Soap Opera' which is expected to be widely viewed (it has a 75% likelihood of being viewed). The logical destination is 'London Region' which comprises 50,000 distinct physical destinations. The order specifies that this delivery is to be considered a relative priority and the computed cost score is $47. Delivery will start at 10:00 on Thursday, will deliver the content at a rate of 6 Mb/s and will end at 10:30.

Candidate allocation 1703 makes use of a download server assigned to the delivery option entitled 'Euro Data Centre'. As this is a candidate allocation to fulfil the same order, the asset to be delivered, associated viewing likelihood, destination and criteria are identical to that described above in relation to candidate allocation 1701. This delivery starts earlier, at 06:00 on Tuesday but takes longer to deliver the content as the rate is lower at 1 Mb/s. The delivery ends at 09:00 on Tuesday. The computed cost score for this candidate allocation is higher, at $1500, reflecting the unicast mode of transmission and the resulting capacity needed to address the number of distinct delivery destinations.

Candidate allocation 1705 makes use of a streaming server assigned to the delivery option entitled 'CDN Services Inc'. As above, the assets, destination and order criteria remain the same. However, in this case the delivery is intended to be on-demand. Peak viewing time is estimated to be at 19:00 on Friday and the content bitrate is 3 Mb/s. The content duration is one hour. The computed cost score for this allocation is higher again at $10,000. This reflects the number of distinct delivery destinations modified by the likelihood of viewing, since the CDN is charging on a quantity delivered basis, as well as the high rate charged by the CDN and the relatively large quantity of content delivered at this bitrate and duration.

For each candidate allocation, the system generates an overall score and selects the candidate allocation with the lowest score (step 211).

The overall score is obtained by applying one or more configured heuristics to generate values that are then combined by computing a weighted sum.

Heuristics represent decision objectives and their terms are assigned from the attributes of candidate allocations and order criteria. Each heuristic is typically formulated in terms of a minimization function.

Default objectives that are typically applied by the system include minimizing cost, minimizing time until delivery completion and minimizing the duration of delivery.

The presence of a deadline in the order criteria causes the system to select a heuristic that minimizes the positive deviation between a deadline specified in the order criteria and delivery completion time. The presence of a priority flag in the order criteria causes the system to select a heuristic that minimizes time until delivery completion with a non-linear bias towards early delivery. This replaces the default objective.

Figure 18:
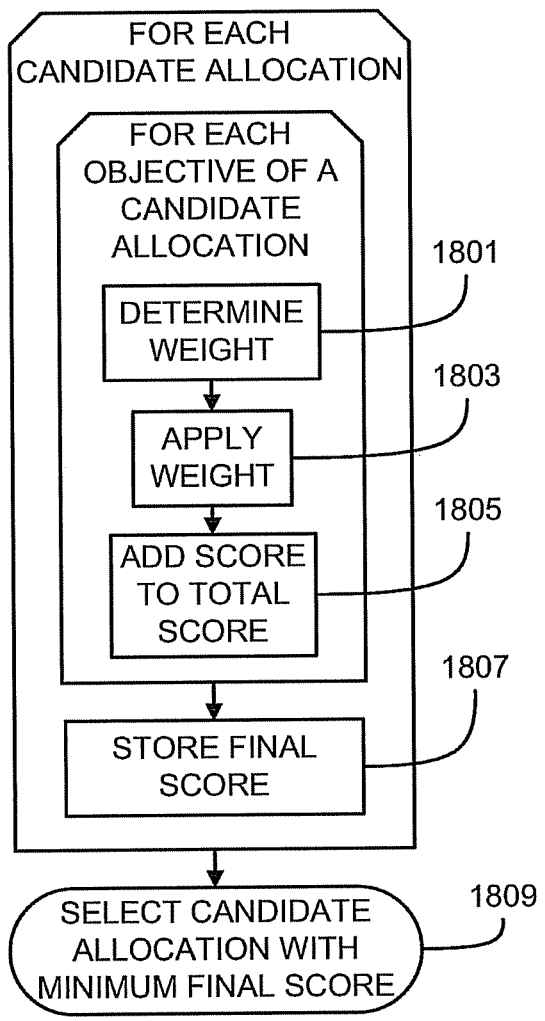
FIG. 18 is a flow chart of a method of selecting a candidate allocation according to embodiments of the present invention.

Each heuristic is configured with a weight between 0 and 1 that reflects its relative importance to the platform. Referring to FIG. 18, for each objective of each candidate allocation, a weight is retrieved (step 1801) and the system then modifies a normalized value returned by a heuristic by multiplying by its weight to obtain a score (step 1803). The resulting set of weighted values (scores) are then summed into an overall total score (step 1805) which is then stored (step 1807). The system then selects the candidate allocation with the lowest score (step 1809). Tables showing example objectives, normalized values, weights, scores and overall scores are shown in FIG. 19. In this example, cost is valued above all other objectives (weighting of 0.6) with time to deliver (weighting 0.3) and time to completion (weighting 0.1) being deemed by the platform to be less important.

It is to be noted that given the allocation algorithms and cost functions described above, the number of destinations for an asset and the likelihood of viewing have an impact on the resulting cost of a candidate allocation. In particular, for large numbers of destinations where the likelihood of viewing is high, unicast delivery will tend to result in much larger costs than broadcast. This in turn will strongly favour broadcast on the basis of cost for orders of this nature, all other factors being equal.

The system then updates its internal state to reflect the selected candidate allocation, stores the decision and discards the other candidate allocations (step 213). The selected candidate allocation constitutes the delivery plan that fulfils the original order.

The capacity timelines for the delivery option, destinations and scheme associated with the selected candidate allocation are updated in accordance with the way in which capacity has been allocated. The changes to the capacity timelines and the detail of the allocation are then persisted by reference to the order fulfilled, such that a subsequent request to cancel that order may be satisfied. Delivery plan instructions carrying the detail of the delivery plan are generated (step 215) and delivered to the downstream systems that are responsible for executing delivery of the asset.

An automated decision making system has been described that makes efficient use, in terms of transmission cost and time, of a number of heterogeneous delivery mechanisms (such as satellite broadcast and Internet unicast) to deliver video assets to a population of devices with heterogeneous acquisition capabilities (such as broadband enabled multi-tuner STBs). Some advantages of the above described system include: the abstraction of key aspects of otherwise heterogeneous delivery mechanisms into a model of common, comparable elements; the reduction of asset delivery orders for hierarchically organized destinations into distinct delivery paths involving specific delivery mechanism elements, based on the model; the determination of the available capacity for each distinct delivery path by applying an algorithm to a number of capacity timelines, each capacity timeline representing the available capacity over time for a given delivery mechanism element; the production of a range of feasible allocations within time and capacity constraints to satisfy a given order by reference to the available capacity for a delivery path, using algorithms designed to reflect the influence of multiple factors on the way in which capacity is allocated, specifically including likelihood of viewing; the assignment of a cost score to each allocation using a cost function designed to reflect the way in which usage of capacity associated with a particular delivery mechanism incurs cost to the platform; and the use of the technique of minimizing the weighted sum of objective functions to select a preferred allocation from a set of candidates, based on the candidate attributes and a number of objectives that are specified partly by the order under consideration and partly by system configuration. Other advantages will be apparent to someone skilled in the art.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

The invention claimed is:

1. A method of delivering an audio video asset, said method comprising:
   receiving orders, each order specifying an audio video asset to be delivered and a delivery destination for said audio video asset, wherein said delivery destination represents one or more physical delivery recipients;
   determining delivery paths that could be used to deliver said audio video asset to said delivery destination, wherein said determining comprises: for each delivery path, matching a delivery sink associated with a delivery capability to a delivery source represented by a delivery option according to one or more criteria of a delivery scheme representing a delivery technology;
   retrieving a set of path capacity timelines for said delivery paths, wherein path capacity timelines in said set of path capacity timelines each model a quantity of available capacity varying over time;
   processing said path capacity timelines to yield delivery path capacities;
   applying an allocation algorithm to said delivery path capacities to yield candidate delivery allocations, wherein said candidate delivery allocations each comprise one or more time periods during which one or more time periods a defined quantity of capacity can be allocated for delivery of said audio video asset;
   applying a cost function to said candidate delivery allocations to yield cost values, said cost function parameterized by at least one time period, said at least one time period associated with at least one cost factor for calculating said cost values according to at least said at least one time period, wherein said cost values each represent a cost of delivering said audio video asset according to said candidate delivery allocations;
   calculating scores for said candidate delivery allocations in dependence on a cost value for each of said candidate delivery allocations and one or more other objectives;
   selecting one of said candidate delivery allocations having a lowest score to yield a selected candidate delivery allocation; and
   delivering said audio video asset according to said selected candidate delivery allocation.

2. The method of claim 1, wherein said order further specifies a criterion concerning a way in which said order is to be fulfilled.

3. The method of claim 2, wherein said criterion comprises a time window within which said audio video asset is to be delivered.

4. The method of claim 3, wherein said criterion comprises a priority flag indicating that delivery of said audio video asset is to be considered a priority relative to delivery of other audio video assets.

5. The method of claim 1, wherein said determining delivery paths further comprises removing delivery paths that do not satisfy rules governing use of delivery options with said delivery destinations.

6. The method of claim 1, wherein said retrieving said set of path capacity timelines comprises: for each delivery path, retrieving a path capacity timeline associated with said delivery destination option and a path capacity timeline associated with said delivery destination.

7. The method of claim 6, wherein said retrieving said set of path capacity timelines further comprises: for each delivery path, retrieving a path capacity timeline associated with said delivery scheme.

8. The method of claim 6, wherein said retrieving said set of path capacity timelines further comprises: for each delivery path, determining whether said delivery destination has any child destinations and examining any child destinations for further child destinations until a leaf destination is identified; and retrieving a path capacity timeline associated with said leaf destination.

9. The method of claim 1, wherein said processing of said path capacity timelines comprises: performing a minimization function over each set of path capacity timelines.

10. The method of claim 1, wherein said allocation algorithm allocates capacity as early as possible within a limit of available capacity specified by a delivery path capacity, and said capacity to be allocated is calculated from a size of said audio video asset to be delivered and a number of physical delivery recipients.

11. The method of claim 1, wherein said allocation algorithm allocates capacity over a period proportional to a defined peak capacity to mean capacity ratio and a defined peak capacity period, and said capacity to be allocated is calculated from a size of said audio video asset to be delivered, a number of physical delivery recipients, and a likelihood of said audio video asset being viewed, wherein said likelihood of said audio video asset being viewed is derived from content viewing statistics.

12. The method of claim 1, wherein said allocation algorithm:
identifies existing allocations for said audio video asset to be delivered;
if existing allocation exists, allocates capacity congruent with said existing allocation; and
otherwise allocates capacity as early as possible within a limit of available capacity specified by a delivery path capacity;
wherein said capacity to be allocated is calculated from a duration and an encoded bitrate of said audio video asset to be delivered.

13. The method of claim 1, wherein said allocation algorithm is parameterized with one or more time windows representing one or more time periods, and one of said candidate delivery allocations is returned for each of said one or more time periods.

14. The method of claim 1, wherein each of said candidate delivery allocations comprises more than one contiguous time period.

15. The method of claim 1, wherein said cost function is further parameterized with a plurality of capacity bands, each capacity band in said plurality of capacity bands being associated with one of said at least one cost factor, and said cost function identifies a set of peak capacity values in a delivery path capacity at regular intervals over a fixed said time period, discards a greatest 5% of peak capacity values in said set of peak capacity values, selects a next greatest peak capacity value to be a peak capacity value for said fixed time period, determines a cost for said fixed time period by multiplying said peak capacity value for said fixed time period by a cost factor determined by reference to a capacity band, and determines a cost value for a said candidate delivery allocation as a function of usage represented by said candidate delivery allocation and a cost for said fixed time period.

16. The method of claim 15, wherein said at least one time period is multiple time periods time periods, each of said multiple time periods being associated with said capacity bands and one of said at least one cost factor, wherein cost for an overall period is calculated as a weighted sum of each said time period.

17. The method of claim 1, wherein said cost function is further parameterized a plurality of capacity bands, each of said capacity bands in said plurality of capacity bands being associated with one of said at least one cost factor, and calculates data delivered within a fixed said time period including said candidate delivery allocation, determines said cost factor by reference to one of said capacity bands, and calculates a cost value for said candidate delivery allocation as a function of said data and said cost factor.

18. The method of claim 1, wherein said cost function is further parameterized with quantity bands, wherein each of said quantity bands is associated with one of said at least one cost factors, and a relevant said cost factor is determined by reference to both said quantity bands and said fixed time period.

19. The method of claim 1, wherein said cost function calculates usage represented by said delivery candidate allocation as a proportion of total capacity over said at least one time period, and calculates said cost value for said candidate delivery allocation as a function of said proportion and said cost factor.

20. The method of claim 1, wherein said one or more other objectives comprise: minimizing cost; or minimizing time until completion of delivery of said audio video asset; or minimizing duration of delivery of said audio video asset.

21. The method of claim 20, wherein said calculating scores for said candidate delivery allocations comprises:
for said one or more other objectives, retrieving an objective weight, and modifying a normalized value for said objective by multiplying said normalized value by said objective weight, thereby yielding a set of weighted values; and
summing said set of weighted values to yield said score.

* * * * *